United States Patent [19]
Kisovec

[11] 3,797,783
[45] Mar. 19, 1974

[54] CONVERTIPLANE
[76] Inventor: Adrian V. Kisovec, 10 Waterford Way, Wallingford, Pa. 19086
[22] Filed: May 25, 1972
[21] Appl. No.: 256,651

Related U.S. Application Data
[63] Continuation-in-part of Ser. No. 57,055, July 22, 1970.

[30] Foreign Application Priority Data
July 23, 1969 Great Britain.................... 37068/69

[52] U.S. Cl................................................ 244/7 A
[51] Int. Cl............................................ B64c 27/22
[58] Field of Search.......... 244/6, 7 R, 7 A, 7 C, 39, 244/42 R, 43

[56] References Cited
UNITED STATES PATENTS
3,494,707  2/1970  Kisovec.............................. 244/7 R
3,207,457  9/1965  Kisovec.............................. 244/7 A
2,411,297  11/1946  Serna................................. 244/7 A

Primary Examiner—Trygve M. Blix
Assistant Examiner—Charles E. Frankfort

[57] ABSTRACT

This invention combines rotating wings with a jet engine to provide helicopter type vertical lift and pure jet forward propulsion when the rotating wings are stowed in a manner to provide useful fixed wing lift.

This invention provides for a converticraft incorporating the advantage of low disc loading in the helicopter mode providing for vertical lift while retaining efficient forward flight characteristics including pure jet operation, high lift over drag ratio and high wing aspect ratio. A substantial portion of the rotor is used as a useful wing extension in high speed configuration and accordingly reduces parasitic weight. This is primarily accomplished by a tilt rotor jet engine assembly mounted on the outboard end of the center wing section and having rotary wings to provide helicopter type lift. When the jet engine is rotated for forward thrust one of the two rotary wings is positioned to form an aerodynamically useful extension of the center wing section to reduce induced wing drag. The other rotary wing is stowed in the bottom of the center wing where it may be selectively and optionally used to increase airfoil camber when that is desirable as in low speed forward flight.

13 Claims, 13 Drawing Figures

CONVERTIPLANE

RELATED APPLICATION

This is a continuation-in-part of my pending application, Ser. No. 57,055 filed July 22, 1970 entitled "CONVERTIPLANE."

BACKGROUND OF THE INVENTION

Tilt wing and tilt rotor concepts are known in the art. Certain of these configurations employed a propeller with its inherent inefficiency for hover purposes. Attempts at helicopter type structures of low disc loading have provided storage problems, parasitic weight and increased rather than decreased drag. My invention overcomes these difficulties. A substantial portion of the rotary wing is used to decrease drag. Simultaneously, the storage of the remaining rotary wing is uniquely and advantageously improved to prevent alteration of the contour of the fixed wing section. Thus, drag and parasitic weight are reduced.

SUMMARY OF THE INVENTION

A preferred embodiment of the invention is shown as a fixed wing aircraft designed for high speed subsonic flight. The wing tip sections of the center wing are replaced by a jet engine mounted for rotation about a horizontal axis so that the axis of the engine may be moved from the horizontal (forward thrust) to the vertical (upward thrust). To the forward end of the engine there is mounted an extended structure to support rotary wings driven through a reduction gear box by the jet engine and whose center of rotation is co-axial with the axis of the engine. There is also shown a modified configuration particularly useful for a supersonic aircraft.

Means are provided for cyclic pitch control during hovering flight and during conversion to fixed wing flight powered by the tilt jet engines.

The arrangement of parts is such that as the center section of the wing assumes the burden of lift, the disc plane of the rotary wing is tilted about the lateral axis of the aircraft and then the sections may be disengaged and feathered to a stop. Once the rotational movement is terminated, the feathered rotary wings are moved along their extended supporting structure closer to the engine and then rotated into alignment with the center wing by an electrical or hydraulic motor. One of the blades is stowed into a recess formed at the undersurface of the center wing while the outboard blade becomes a continuation of the wing to produce lift and high wing aspect ratio. If desired, the extending tip may, of course, also be employed as a control surface.

By combining, in accordance with the invention, the helicopter function with the jet engine, high efficiency helicopter lift is obtained while efficient aerodynamic cleanliness is retained for the fixed wing flight mode with a substantial reduction of parasitic weight and induced wing drag.

DESCRIPTION OF THE PREFERRED EMBODIMENT

Figure 1:
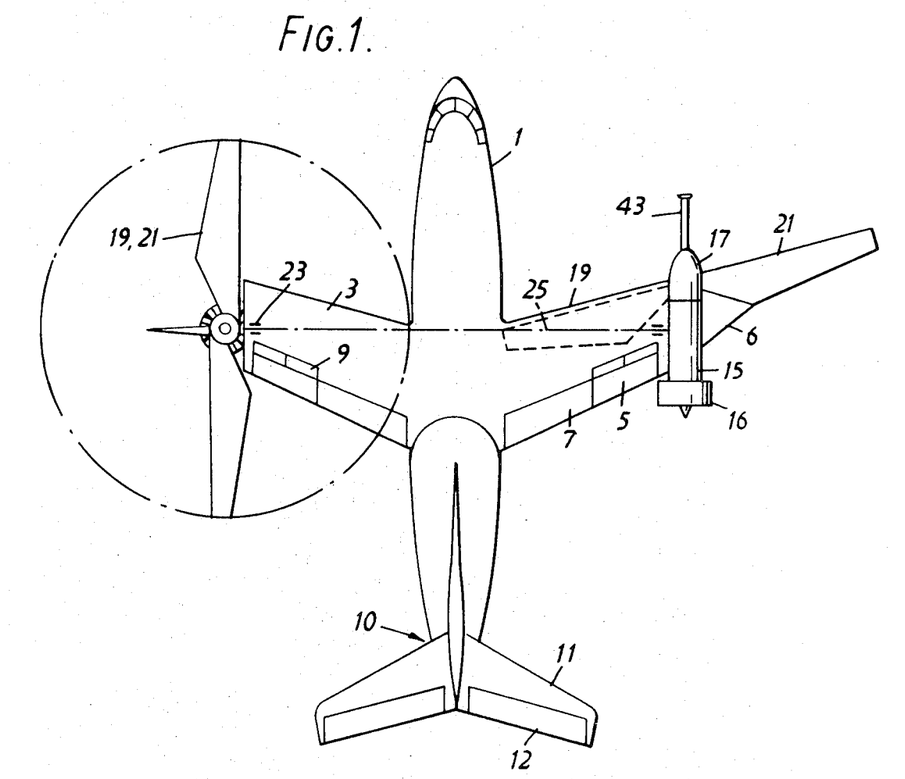
FIG. 1 is a plan view of the aircraft embodying the invention and illustrating the left tilt rotor in the hovering mode and the right tilt rotor in the fixed wing flight mode.
Figure 2:
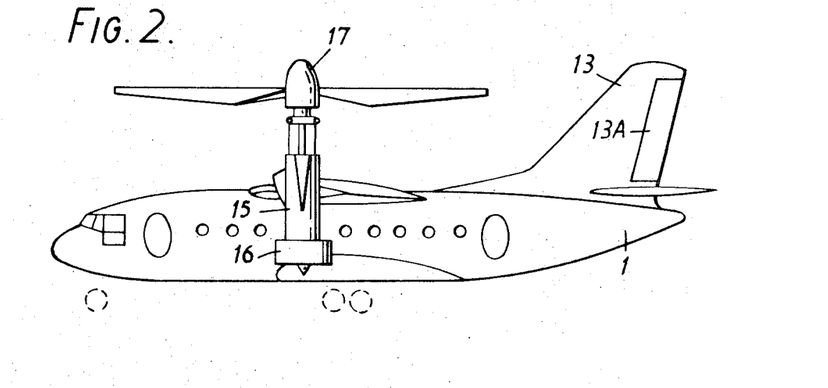
FIG. 2 is a side elevation of the aircraft in the hover configuration.

Referring to the drawings in detail, the aircraft illustrated in FIGS. 1 and 2 has a fuselage 1, a center wing 3 with flaps 7, ailerons 5 and spoilers 9, a conventional empennage 10 with a horizontal stabilizer 11 and a vertical stabilizer 13 having a rudder 13a. At each end of the center wing 3 there is pivotally mounted an engine nacelle 15 with fans 16. Each nacelle 15 pivots about a bearing 23 hereinafter further described. The left nacelle 15 is shown in FIG. 1 in a vertical position for the hover mode of operation. The right nacelle 15 is shown in FIG. 1 in the forward flight mode of operation.

For orientation, the rotor hub or head 50 with its attached fairing 17, mast 43, inboard rotary wing or blade 19 and outboard rotary wing or blade 21 are illustrated. It should be understood that the reference 21 will be used for the outboard blade while the reference 19 will be used for the inboard blade in this description. However, there is no difference between the inboard and the outboard blades except a random selection when the blades 19, 21 are retracted and positioned for fixed wing flight. With further reference to FIG. 1, it will be noted that the blades when feathered define a cut-out medial section. When outboard blade 21 is positioned for fixed wing flight, the cut-out is filled for aerodynamic continuity by a triangular section 6 secured to the nacelle 15. The inboard blade 19 is, of course, housed or nested in a recess 2 (FIG. 3) on the underside of the wing. Recess 2 is conveniently formed to the shape of blade 19.

Figure 10:
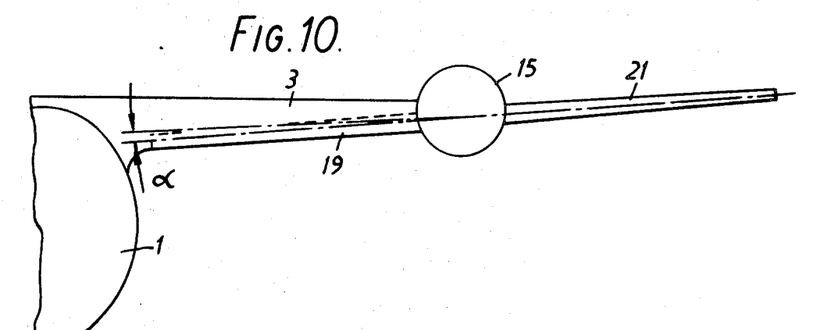
FIG. 10 is a schematic rear elevation showing the stowage of the right hand rotor and its alignment with the center wing section.

Referring to FIG. 10, it will be noted that there is substantial alignment between the chord plane of the blade(s) 19, 21 and the chord plane of the center wing 3. While it is geometrically possible to have actual perfect alignment between the chord planes, it is practically preferred to have a small misalignment represented by the angle $\alpha$ in FIG. 10. This misalignment results only from the selection of the airfoil shape and not from the location of the axis of rotation of the rotary wings 19, 21. The important desirable consequence of this configuration is that the inboard blade 19 does not distort the airfoil of the center wing 3 but forms a functionally integral part of the desired configuration of that airfoil.

In operation, the aircraft is borne aloft in the helicopter configuration shown in FIG. 2 and also indicated for the left hand wing in FIG. 1. The rotary wings 19, 21 are driven by means hereinafter explained from the jet engine in nacelle 15. Thereafter, the aircraft is moved forward, preferably by gradually tilting the rotary wing disc plane and the nacelle 15 forwardly. It is understood that the helicopter configuration for forward movement may be employed if desired, that is, the swash-plate hereinafter described can be constructed for forward propulsion in a manner well known in the art.

As the aircraft picks up forward speed, the center wings 3 gradually unload the rotary wings and assume the function of lift, while the rotor thrust and jet propulsion from the engine maintain the forward speed as the nacelle 15 is swung fully to the horizontal position.

Figures 3, 5:
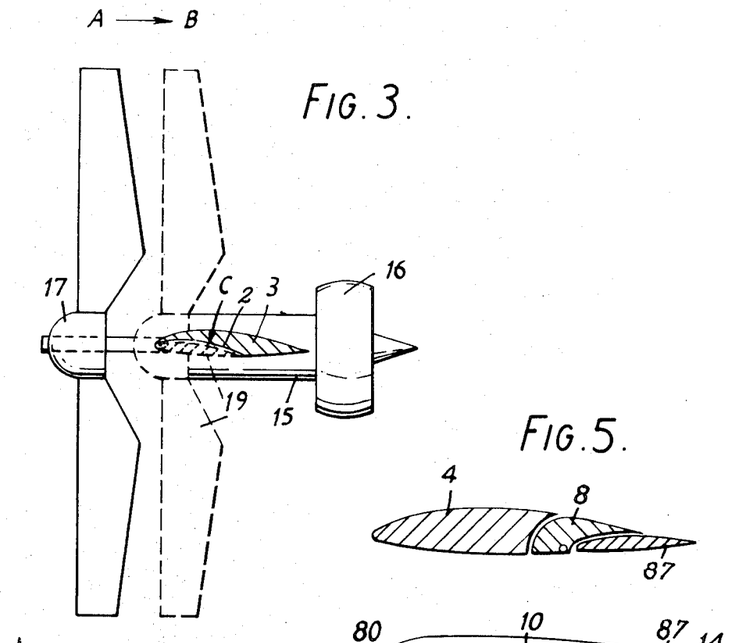
FIG. 3 is a side view of right wing and engine nacelle showing the rotor in extended position A, retracted position B and stowed position C.
FIG. 5 is a sectional view through V—V of FIG. 4.

When the nacelle is in the horizontal position and the aircraft is moving at sufficient forward speed to maintain complete lift on the center wings 3, the rotor blades 19, 21 are uncoupled at clutch 33 and then feathered for stopping, as illustrated in position A of FIG. 3. Thereafter, the hub 50 is moved backward off the spline 45 and along the mast 43 by means of the swash-plate actuators 37. The rotor is slowly turned by a mechanism hereinafter described to house the inboard blade 19 in the recess 2 and position the outboard blade 21 as a continuation of the wing to provide additional lift, higher wing aspect ratio and consequently a reduction in induced drag.

Figure 7:
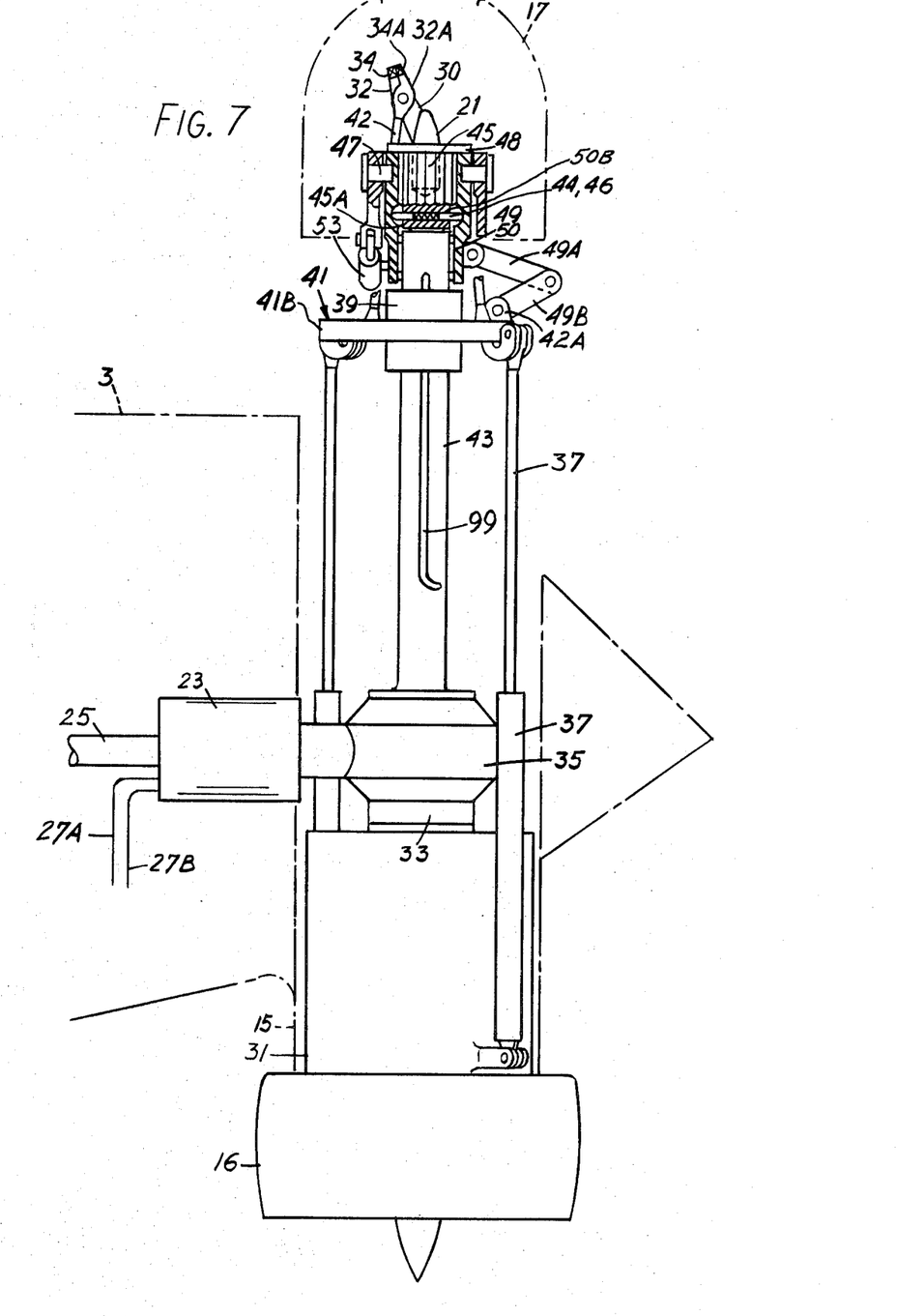
FIG. 7 is a detailed showing of the right wing rotor hub and engine nacelle and adjacent wing and rotor structure with rotary drive shown in the extended position.
Figure 7A:
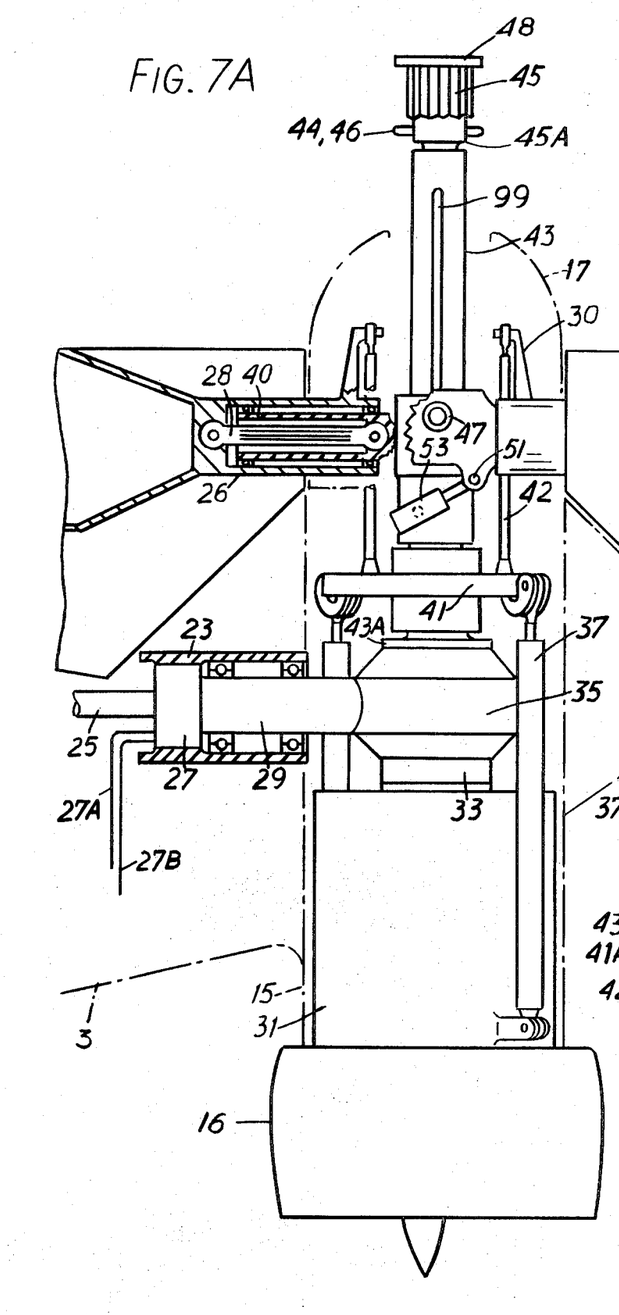
FIG. 7a is a detailed showing of the right wing rotor hub and engine nacelle and wing and rotor structure with rotary drive shown in the retracted position.

Referring now to FIG. 7, the nacelle 15 contains the jet engine 31 shown preferably with the fan 16. To the front of the engine 31 is mounted a clutch 33 drivingly connected to a reduction gear box 35. The gear box 35 of the right hand rotor is interconnected by means of a synchronizing shaft 25 to the gear box of the left hand rotor. A tubular extension 29 of the gear box 35 is rotatably mounted (in a wing structure) in a bearing housing 23 secured to the wing. An electrical rotary actuator 27, operated through the electrical conduits 27a and 27b, rotates the nacelle 15 and its associate structures. Actuator 27 may be operated by hydraulic or other means if desired. To the forward end of the gear box 35 an integral flange 43a is secured to the hollow mast 43. A rotary shaft 45a driven at a reduced speed from the reduction gear box 35 passes through the mast 43 and has formed on its extending portion a spline 45.

In FIG. 7 two positions of the rotor are shown, namely positions for the rotary and fixed wing mode. Thus, rotor hub and control mechanism details are shown in each of two positions. In the fixed wing mode, when the hub 50 and blades 19, 21 are retracted to position B (FIG. 3) the swash-plate 41 is close to the gear box 35. This swash-plate is mounted on a slider sleeve 39 which can slide on the mast 43. The axial movement of the swash-plate on the mast 43 is accomplished by means of the two actuators 37. These actuators are used both for cyclic and collective pitch control as well as for rotor retraction and extension. Pitch links 42 are pivotally connected to blade pitch arms 30. The rotor blades 19, 21 teeter about pivot pins 47 in the hub or head 50. The actuator motor 53 is used to position the rotor at the desired angle to become aligned with the wing.

Referring to FIG. 7, a plug 48, fastened into the spline 45 of the rotor shaft 45a retains the rotor head 50 to carry the thrust load. The relatively small negative thrust loads or hub weight are supported by a double pin and spring combination 44, 46 installed inside of the rotor shaft 45a immediately adjacent to the spline area. The rounded ends of pins 44 engage corresponding internal rounded recess 50B of the cylindrical rotor head 50 to support these small loads while allowing retraction of the head 50. During retraction the pins 44 are forced inside the shaft against the force of the spring 46.

In its extended position, the rotor head 50 rides on a spline 45 of the rotor shaft 45a rotating within the mast 43. Thus, the torque is transmitted from the engine 31 through clutch 33, transmission 35, shaft 45a and spline 45 to rotor head 50 and blades 19, 21.

Figure 8:
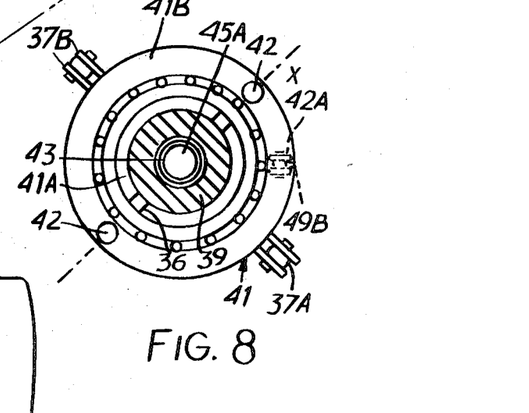
FIG. 8 is a detailed showing of the swash-plate, slider, mast and shaft.

In order to feather the blades 19, 21 as mentioned above, the clutch 33 is opened and the swash-plate 41 is moved toward the hub 50 by means of actuators 37 to the positon shown in FIG. 7. When the ball 91 engages groove 99 as hereinafter described, it prevents rotation of the hub 50 and the forward movement of the aircraft through the air will assist in maintaining the feathered position of blades 19, 21. However, to provide a positive means of maintaining the feathered position during retraction, I provide the scissor-like extensions 32, 32a at the articulation of the link 42 with pitch arm 30. The extensions 32 and 32a have attached electro-magnets 34 and 34a at the resting surfaces which provide selectively a positive locking force. In order to drivingly rotate the outer race 41B on swash-plate 41, the hub 50 is connected to race 41B by accordian-like scissor linkages 49A and 49B. The links 49B are secured to the race 41B by the lugs 42a. These scissor links allow for both rocking movement and axial movement of the swash-plate 41 relative to the hub 50 while providing a positive rotatively driven connection. Referring to FIG. 8, it will be seen that swash-plate 41 is pivotally mounted on the mast 43 to rock about axis X. The inner stationary race 41A is actuated from actuator 37 whose rods 37A engage lugs 37B of inner race 41A. The pitch links 42 are pivotally attached to the outer race 41B.

Prior to retraction the actuator 53 positions the arms 40 carrying the blades 19, 21 which are retained by tension-torsion straps 28 which allow feathering or pitch motion of blade root housing 26.

Figure 9:
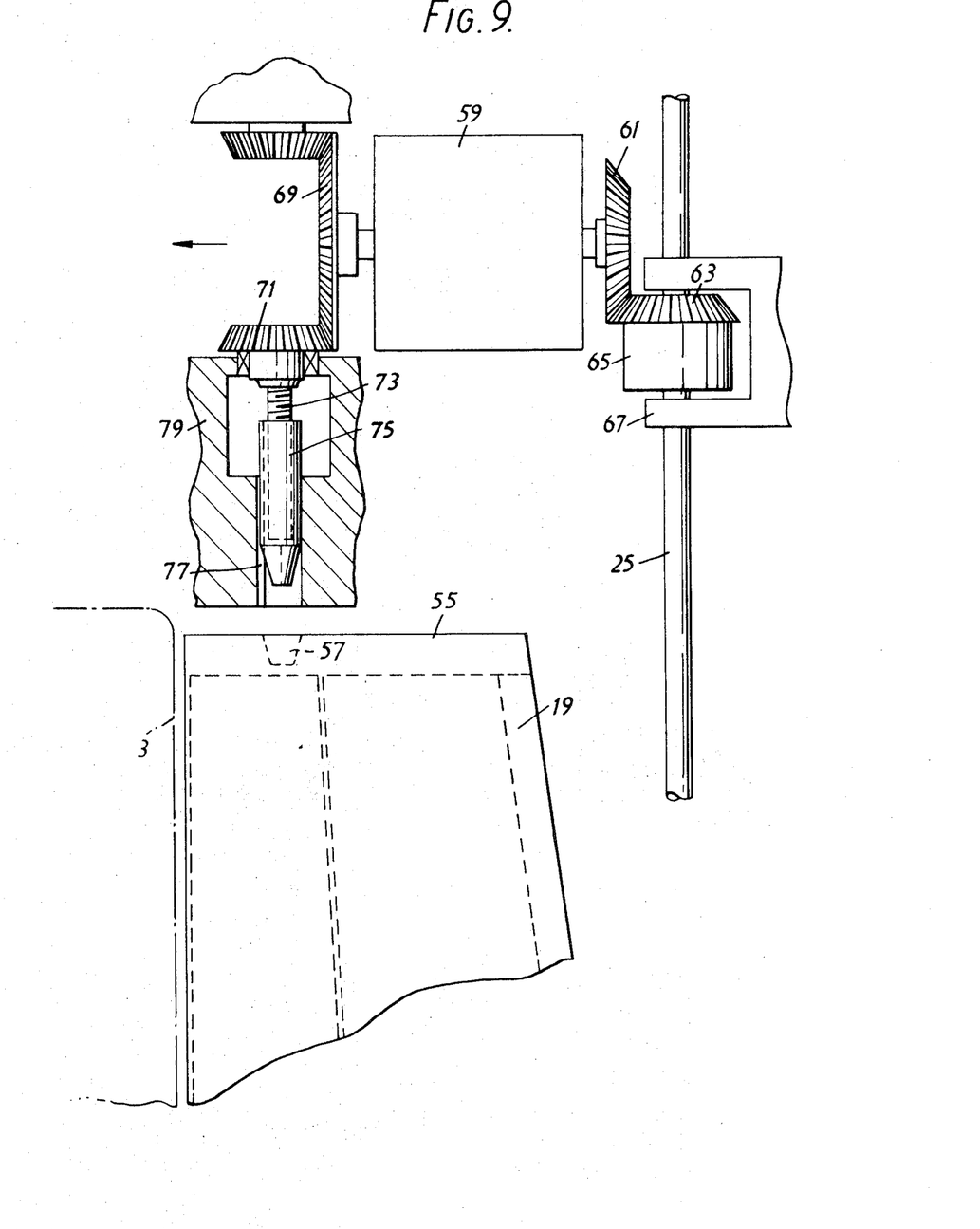
FIG. 9 is a detailed view from the bottom of the positioning and locking mechanism for the right hand rotor.
Figure 11:
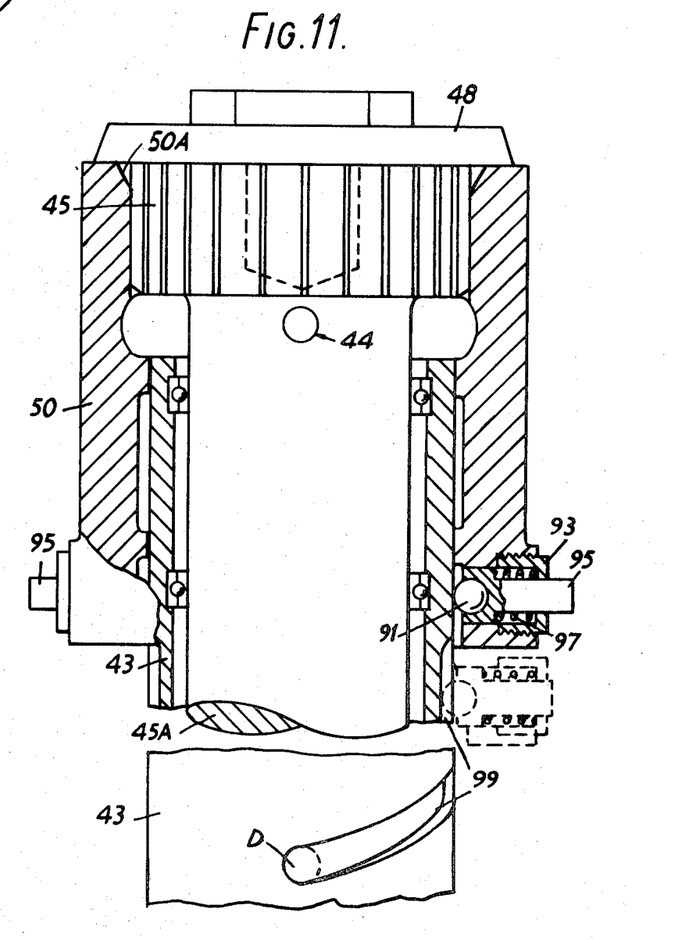
FIG. 11 is a detailed section through the hub showing the spline and the guiding mechanism for the hub during retraction.

Referring to FIG. 11, retraction of the hub 50 and nesting of a blade 19 or 21 in recess 2 of center wing 3 is accomplished in the following manner. Electric motor or actuator 59 through bevel gear train 61, 63 and clutch 65 rotates shaft 25 (clutch 33 being open) to position hub 50 so that ball 91 is aligned with groove 99. As the actuators 37 move the hub 50 axially along the mast 43 in the direction of retraction toward nacelle 15, ball 91 engages groove 99 to rotate the hub 50 around the mast 43 to bring a blade 19 or 21 into the inboard nesting position C. As the ball 91 reaches position D (FIG. 11), motor 59 (FIG. 9) is energized and through a bevel gear train 69, 71 rotates screw jack 73 and advances pin 75 held against rotation by key 77, into conical bore 57 in the tip rib 55 of blade 19 (21) now nesting in recess 2. It should be noted that two assemblies 91, 93, 95 and 97 positioned 180° apart are shown but only one groove 99 is needed.

Extension of the hub for transition to the rotary wing mode or helicopter configuration is achieved first by retracting pin 75 by motor 59. Then actuator 37 will move swash-plate 41 axially from nacelle 15. Ball 91 in groove 99 will rotate the hub 50 to un-nest inboard blade 19 (21). Motor 59 is de-energized and clutch 65 disengaged. As hub 50 moves toward the spline 45, the bevel 50A forces pins 44 inwardly in shaft 45A where they remain until they engage the recess 50B as hub 50 completes its travel. When the internal spline of hub 50 engages spline 45 of shaft 45A, clutch 33 is engaged, electro-magnets 34 and 34a are de-energized and blades 19, 21 are gradually unfeathered as they start to rotate and press the hub 50 against plug 48 permitting normal action of the swash-plate to obtain cyclic and collective pitch control. To complete the transition, the nacelle 15 is rotated by actuator 27 to the vertical position.

In another embodiment of the invention (FIG. 12) the rotor hub 101 has an extension 105 with the internal spline 107. The length of this extension 105 corresponds to the required retraction travel of the hub 101. Hub 101 is open at 109 to allow for installation of shaft 110. Hub 101 also has a shoulder 103 whose upper canted surface 103a bears against a corresponding bevel 112 formed on the shaft 110, below the spline 111. Thus rotor thrust loads are carried by interaction of face 103a and bevel 112. Small static and negative thrust loads are carried by a combination of two pins 144 in engagement with the rounded bottom surface 103b of the hub shoulder 103. When the hub is moved axially for retraction toward the engine nacelle 15, the cam action between pins 144 and the rounded bottom surface of the face 103a will force the pins inside the shaft 110, against the pressure of a compression spring 146.

Figure 12:
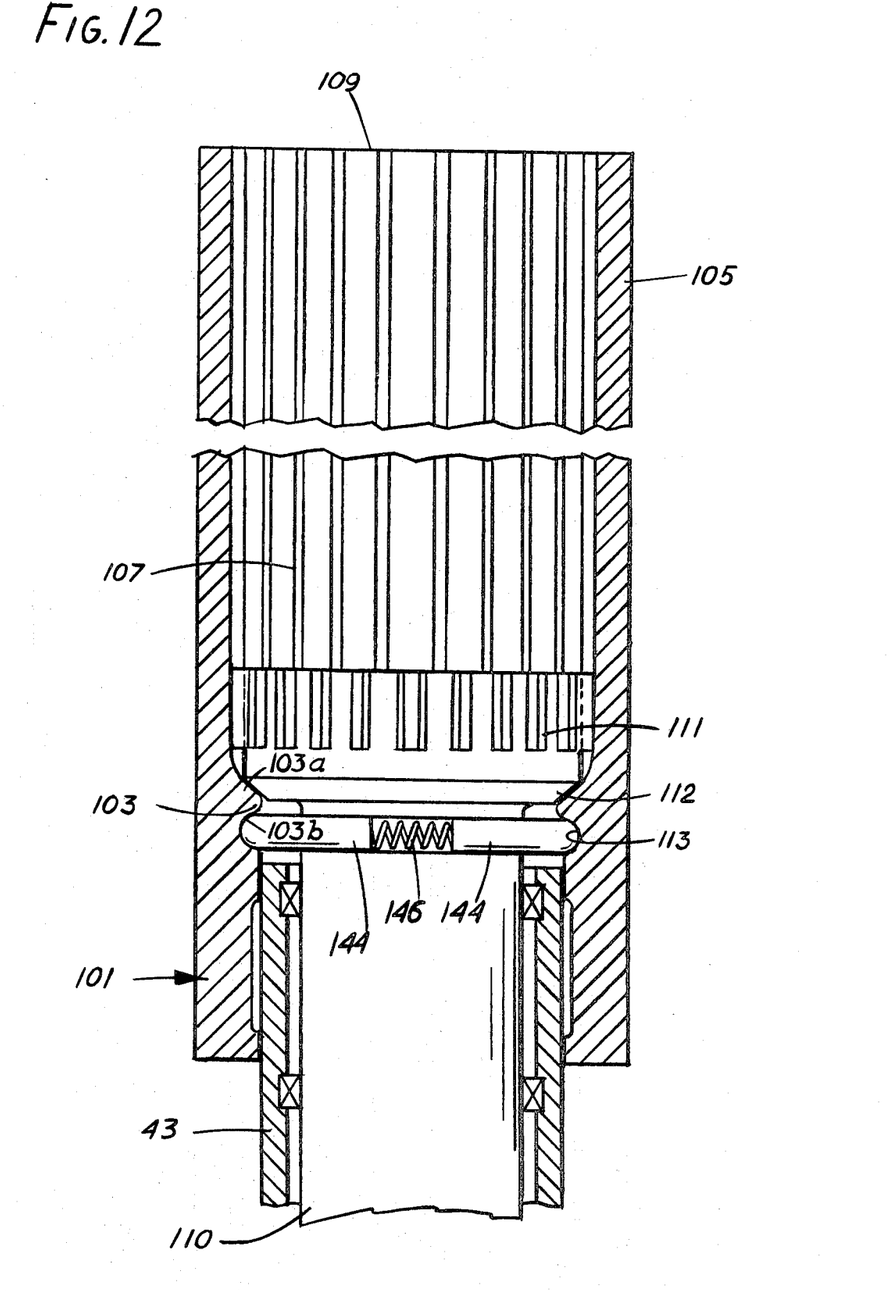
FIG. 12 is a detailed section of a modified hub in engagement with the spline of a drive shaft.

During retraction of the hub 101, pins 144 pass the bottom face 103b and slide along the internal spline 107 of the hub extension 105. During reverse movement of the hub, pins 144 will slide over the upper canted face 103a until they pass rounded shoulder 103 to drop into the rounded recess 113. The pins 144 are retained in recess 113 by the urge of spring 146.

After the rotor, containing hub 101 and blades 19, 21 is retracted, the clutch 33 is disengaged and rotary actuator 59 (FIG. 9) positions the blades 19, 21 by interaction of the shaft spline 111 and the inner spline at the upper end of hub extension 105, whereby hub 101 is being rotated about mast 43 moving the inboard feathered blade 19 into recess 2, position C of FIG. 3. Actuator 59 drives a bevel gear train 61, 63 through a clutch 65 engaging the synchronizing shaft 25. Simultaneously, the actuator 59 through a bevel gear train 69 and 71 acts on a screw jack 73 and drives a bolt 75 home in a conical bore 57 in the tip rib 55 of the blade 19. In order to prevent the pin 75 from rotating a key way in the pin receives the key 77 in the wing root structure 79. The rotational travel of the rotor blade 19 and the axial travel of the pin 75 are synchronized so that the conical front end of the pin 75 starts entering the conical bore 57 only after the blade 19 has reached the recess 2. Further travel of the pin 75 into the conical bore 57 occurs while the interconnecting shaft 25 is being somewhat twisted by the torque of the actuator 59. This preload on the shaft 25 secures a tight fit of the blade 19 in the recess 2 in addition to being fastened by the pin 75. In this way, relative movement between the blade and the wing under aerodynamic and inertial loads is eliminated.

Figures 4, 6:
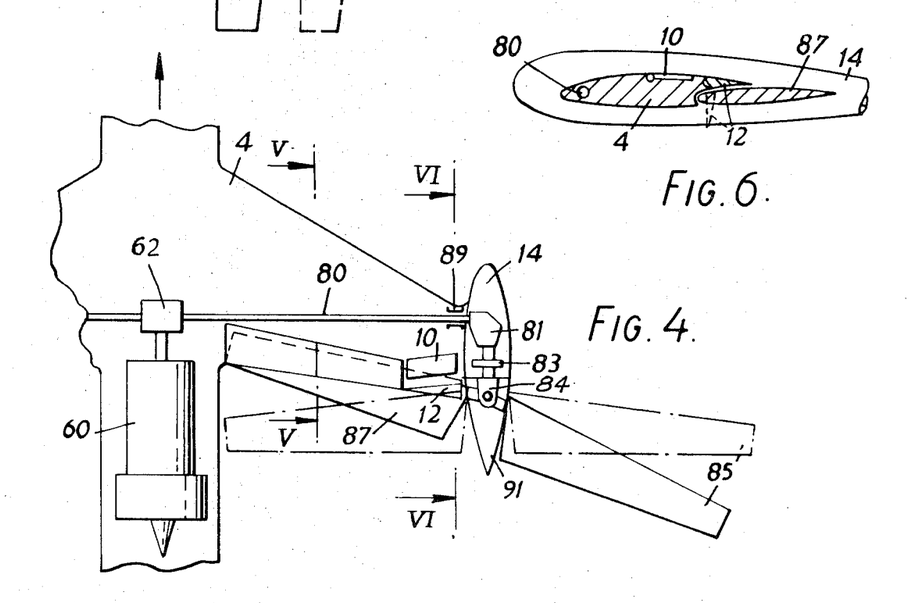
FIG. 4 is a partial plan view showing the right wing structure of another embodiment of the invention.
FIG. 6 is a sectional view through VI—VI of FIG. 4.

Rotation of blades 19, 21 for transition into the helicopter mode is accomplished by a reversed sequence of the aforementioned functions.

Where it is desired to tilt the rotors aft or displace the rotor shaft from the engine, the embodiment illustrated in FIGS. 4, 5 and 6 may be advantageously employed. This arrangement is particularly useful with swept back wings as frequently used in supersonic aircraft.

Referring to FIG. 4, it will be seen that the center wing 4, secured to a fuselage 1 has flaps 8 and supports at its tip a nacelle 14 housing a transmission 81 and a swash-plate mechanism 83 operating the blades 85, 87 on rotating hub 84.

The engine 60 drives a clutch transmission box 62 driving interconnecting shaft 80 to transmission 81.

Nacelle 14 is rotatably mounted in a bearing 89 similar to bearing 23 of FIG. 7. Nacelle 15 is tilted in bearing 89 by similar mechanisms as described in reference to FIG. 7.

However, nacelle 14 and the rotary wing disc plane is tilted aft and feathered when engine 60 has propelled the aircraft forward at sufficient velocity to transfer the lift to the center wing 4.

During the transition to the fixed wing mode of flight, sufficient clearance between the blades 85, 87 and the trailing edge of wing 4 is provided by downward deflection of flap 12 as shown in dotted lines FIG. 6. During transition lateral control is secured by spoilers 10.

As the nacelle 14 reaches the horizontal position the blades 85, 87 are in auto-rotation through disengagement of clutch-transmission 62. The blades 85, 87 are then feathered by means not shown and rocked to the solid line position in FIG. 4 by a device (not shown) such as device 53 of FIG. 7 described above. The inboard blade 87 fits into a recess in retracted flaps 8 and 12 as shown in FIGS. 5 and 6.

I claim:

1. An aircraft having a wing section secured thereto, forward propulsion means on said aircraft, a pair of rotary wings, a swash-plate operatively connected to said pair of rotary wings to provide feathering and cyclic pitch control, rotary drive means drivingly connected to said swash-plate to rotate the same to revolve said rotary wings, means mounting said rotary drive means at the tip of said wing section, said mounting means being tiltable about an axis longitudinal to said wing section to tilt therewith said rotary drive means and the disc plane of said rotary wings, means operative during forward flight of said aircraft to tilt said mounting means about said axis to the horizontal to tilt the disc plane of said rotary wings, said rotary wings being feathered so that one of said rotary wings forms an operative extension of said wing section.

2. A device substantially as set forth in claim 1 and further characterized in that said rotary drive means is drivingly connected to an aircraft engine positioned to propel said aircraft forwardly.

3. A device substantially as set forth in claim 1 snd further characterized in that the rotary drive means comprises a splined shaft, a stationary mast co-axially secured about said splined shaft, said splined shaft extending through and beyond said mast, hub means supporting said rotary wings and slidable along said mast to engage said splined shaft, movable mechanisms engaging said hub means to move said hub along said mast and out of engagement with said spline, guiding devices on said mast, complementary devices on said hub to engage said guiding devices during movement of said hub along said mast to rotate said hub to position one of said rotary wings to form said operative extension of said wing section.

4. A device substantially as set forth in claim 1 and further characterized in that said forward propulsion means is an aircraft engine, disengagable means connecting said rotary drive means to said engine, auxiliary means to rotate said rotary drive means when said disengagable means are disengaged, said rotary drive means having a splined shaft, a stationary mast co-axially secured about said splined shaft, said splined shaft extending through and beyond said mast, hub means supporting said rotary wings, said hub means being slidable along said mast and having a splined extension to engage said splined shaft during said sliding movement along said mast, whereby said auxiliary means may rotate said hub to position one of said rotary wings to form an operative extension of said wing section, said rotary wings being feathered and said disengagable means being disengaged.

5. A device substantially as set forth in claim 1 and further characterized by movable means on said wing section to provide clearance for said rotary wings when said rotary wings are feathered and tilted to the horizontal, means to disengage said rotary wings from said drive means, mechanism to rock said rotary wings to align with said wing section and means to rotate said hub and rotary wings to stow one blade in the trailing edge area of said wing section the other blade forming an operative extension of said wing section.

6. A device substantially as set forth in claim 1 and further characterized in that said rotary drive means is a jet engine and said mounting means is a nacelle containing said engine.

7. A device substantially as set forth in claim 6 and further characterized in that the rotary drive means comprises a stationary mast co-axially secured to said engine and a spline shaft extending through and beyond said mast, hub means supporting said rotary wings and slidable along said mast to engage said spline, said hub means being secured to said swash-plate in rotative driving relation.

8. An aircraft having a wing portion secured thereto, a jet engine tiltably mounted on said wing portion, a swash-plate transmission means detachably drivingly connecting said swash-plate to said jet engine, a pair of rotary wings connected to said swash-plate, said swash-plate being constructed and arranged to provide cyclic pitch control and feathering control to said rotary wings, said swash-plate feathering said rotary wings when said jet engine is tilted to a horizontal position, said transmission means being detached from driving connection to said engine, to stow one of said pair of rotary wings in said wing portion and the other of said pair of rotary wings forming an operative extension of said wing portion for high speed forward flight under the propulsion of said jet engine.

9. A device substantially as set forth in claim 8 wherein said jet engine has a co-axial stationary mast secured thereto, and said transmission means comprises a clutch actuated drive shaft extending through and beyond said mast, said shaft having an engagable surface on the extending portion thereof, a slidable hub, slidable along said mast and having a complementary surface engagable with the engagable surface on said shaft, said hub being in driving connection with said swash-plate, said hub being disengagable from said shaft during movement of said swash-plate and said hub along said mast from an operable driving position to a non-driving stow position, one of said rotary wings forming an extension of said wing portion when said hub and said swash-plate are in said non-driving stow position.

10. A device substantially as set forth in claim 9 and further characterized in that said swash-plate feathers said rotary wing when moved from the operative drive position to the non-driving stow position.

11. An aircraft having a wing secured thereto and a pair of rotary wings mounted on an alongated drive shaft at the wing tip for tilting about a lateral axis, means to tilt said rotary wings about said lateral axis and means to secure said rotary wings to said drive shaft against rotation, selective means for axial displacement of said rotary wings along said drive shaft and separate means to rotate said rotary wings about said drive shaft for retraction of one blade into said wing to form an undistorted wing section and the other blade to form a wing extension in alignment with said wing.

12. An aircraft having a wing secured thereto and a pair of rotary wings mounted on a rotating drive means having an elongated rotary shaft at the wing tips tiltable support means in which said rotatable drive means are rotatably mounted to tilt the disc plane of said rotary wings about a lateral axis of said aircraft and means to secure said rotary wings against rotation, selective means for axial displacement of said rotary wings along the respective rotor shaft and means to rotate said rotary wings about said shafts for near alignment of rotary wing and wing chord planes, one rotary wing and wing chord planes, one rotary wing forming a wing extension to increase wing aspect ratio.

13. Device tiltably mounted on an aircraft wing, comprising an engine tiltable from an upward thrust position to a forward thrust position, a mast extending from said engine, rotary wings mounted for sliding movement along said mast from a driven position to a stow position, means drivingly connecting said rotary wings to said engine when said rotary wings are in said driven position, said means disengaging said engine said rotary wings for movement to said stow position, a feathering device to feather said rotary wings upon said disengagement, at least one of said rotary wings moving along said mast to said stow position to form an extension of said aircraft wing during forward flight said engine being tilted to said forward thrust position.

* * * * *